United States Patent
Van Amelsvoort et al.

(10) Patent No.: US 9,109,166 B2
(45) Date of Patent: Aug. 18, 2015

(54) TREATING A CRUDE AND NATURAL GAS STREAM

(75) Inventors: Jan Van Amelsvoort, The Hague (NL); Andrew Malcom Beaumont, Rijswijk (NL); Paul Clinton, The Hague (NL); Olga Gafonova, The Hague (NL)

(73) Assignee: Shell Oil Company, Houston, TX (US)

( * ) Notice: Subject to any disclaimer, the term of this patent is extended or adjusted under 35 U.S.C. 154(b) by 1128 days.

(21) Appl. No.: 12/741,408

(22) PCT Filed: Nov. 8, 2007

(86) PCT No.: PCT/EP2007/062096
§ 371 (c)(1),
(2), (4) Date: May 5, 2010

(87) PCT Pub. No.: WO2009/059641
PCT Pub. Date: May 14, 2009

(65) Prior Publication Data
US 2010/0242362 A1    Sep. 30, 2010

(51) Int. Cl.
*C10G 7/00* (2006.01)
*B01D 3/14* (2006.01)
*B01D 3/34* (2006.01)
*B01D 19/00* (2006.01)
*C10G 7/02* (2006.01)
*C10L 3/10* (2006.01)

(52) U.S. Cl.
CPC .. *C10G 7/00* (2013.01); *B01D 3/14* (2013.01); *B01D 3/34* (2013.01); *B01D 19/0015* (2013.01); *C10G 7/02* (2013.01); *C10L 3/10* (2013.01); *C10G 2300/1025* (2013.01); *C10G 2300/1033* (2013.01); *C10G 2300/805* (2013.01)

(58) Field of Classification Search
USPC .................................................. 203/95–97
See application file for complete search history.

(56) References Cited

U.S. PATENT DOCUMENTS

| 3,754,376 | A | * | 8/1973 | Kent | 95/258 |
| 3,859,414 | A | * | 1/1975 | Urban | 423/222 |
| 3,923,606 | A | * | 12/1975 | Hausler | 203/7 |
| 4,156,633 | A | * | 5/1979 | Horlenko et al. | 203/93 |
| 4,186,061 | A | * | 1/1980 | Zellers et al. | 203/96 |
| 4,205,962 | A | * | 6/1980 | Marion et al. | 48/197 R |
| 4,257,852 | A | * | 3/1981 | Worrell | 203/99 |
| 4,347,385 | A | * | 8/1982 | Scoggin | 568/72 |
| 4,563,202 | A | * | 1/1986 | Yao et al. | 2/17 |
| 4,698,136 | A | * | 10/1987 | El-Allawy | 203/11 |
| 4,717,408 | A | * | 1/1988 | Hopewell | 62/633 |
| 4,826,662 | A | * | 5/1989 | Mao et al. | 422/610 |
| 4,968,332 | A | * | 11/1990 | Maher | 96/183 |
| 5,672,326 | A | * | 9/1997 | Minak et al. | 423/224 |

(Continued)

FOREIGN PATENT DOCUMENTS

| AU | 2007361218 | 5/2009 |
| WO | 02066137 A1 | 8/2002 |

(Continued)

*Primary Examiner* — Imran Akram

(57) ABSTRACT

A process for treating a crude and natural gas stream, which at least comprises the steps of: (a) passing a crude and natural gas stream (10) through an inlet (12) into a stabilization unit (14) to provide a stabilizer content (20); (b) passing an overhead gaseous stream (30) separated from the stabilizer content (20) through a first outlet (16); and (c) passing a bottom stream (40) comprising crude liquid hydrocarbons separated from the stabilizer content (20) and free water through a second outlet (18).

15 Claims, 4 Drawing Sheets

(56) References Cited

U.S. PATENT DOCUMENTS

| | | | |
|---|---|---|---|
| 5,766,313 A * | 6/1998 | Heath | 95/161 |
| 2003/0134911 A1 * | 7/2003 | Schanke et al. | 518/703 |
| 2004/0238412 A1 * | 12/2004 | Runbalk | 208/340 |
| 2006/0272503 A1 | 12/2006 | Adam et al. | 95/253 |

FOREIGN PATENT DOCUMENTS

| | | | |
|---|---|---|---|
| WO | WO02066137 | 8/2002 | B01D 17/04 |
| WO | 03022958 A1 | 3/2003 | |
| WO | WO03022958 | 3/2003 | C10G 7/00 |

* cited by examiner

Water (vol%) in the feed stream

TREATING A CRUDE AND NATURAL GAS STREAM

REFERENCE TO EARLIER APPLICATION

The present application is a national stage application of PCT/EP2007/062096 filed 8 Nov. 2007.

FIELD OF THE INVENTION

The present invention relates to treating a crude and natural gas stream.

BACKGROUND OF THE INVENTION

Treating a crude and natural gas stream to obtain a stabilized crude hydrocarbon stream and a gaseous stream is a well-known technique which is typically carried out in a stabilization unit. The treating step is also referred to as a stabilization process.

The stabilization process helps to make the crude liquid hydrocarbons more suitable for further processing or handling, such as safe storage and/or for shipment in tankers. The stabilization process is commonly a distillation process, designed to remove undesired compounds such as hydrogen sulphide, lighter mercaptans, lighter hydrocarbons, and for reducing vapour pressure to meet a desired specification such as a specific Reid Vapour Pressure (RVP).

Hitherto, it has always been regarded as extremely important to remove water from the crude and natural gas stream prior to the stabilization unit, and so operate the stabilization unit in a 'dry' mode. This is because typical temperatures used at the top and bottom of a stabilization unit prevent exit of any free water as part of the top or bottom streams. Thus, any free water accumulating in the unit results in foaming and flooding.

WO 03/022958 A1 shows a process for treating a crude containing natural gas, where the crude is first passed through a high-pressure separator to remove water as a bottom stream, followed by a low-pressure separator, and then an optional oil/water separator to further remove any water, prior to reaching an atmospheric separator and withdrawal of stabilized oil.

It is a problem with the conventional stabilization process to require CAPEX and OPEX to minimize water ingress into a stabilizer unit.

SUMMARY OF THE INVENTION

The present invention provides a process for treating a crude and natural gas stream, which at least comprises the steps of:
(a) passing a crude and natural gas stream through an inlet into a stabilization unit to provide a stabilizer content;
(b) passing an overhead gaseous stream separated from the stabilizer content through a first outlet; and
(c) passing a bottom stream comprising crude liquid hydrocarbons separated from the stabilizer content and free water through a second outlet.

The present invention also provides a process for treating a crude and natural gas stream which at least comprises the steps of:
(a) passing a crude and natural gas stream through an inlet into a stabilization unit to provide a stabilizer content;
(b) passing an overhead gaseous stream separated from the stabilizer content through a first outlet; and
(c) passing a bottom stream comprising crude liquid hydrocarbons separated from the stabilizer content through a second outlet;
wherein the crude and natural gas stream includes ≥0.1 vol % free water.

The present invention further provides a process for treating a crude and natural gas stream, which at least comprises the steps of:
(a) passing a crude and natural gas stream through an inlet into a stabilization unit to provide a stabilizer content;
(b) passing an overhead gaseous stream separated from the stabilizer content through a first outlet; and
(c) passing a bottom stream comprising crude liquid hydrocarbons separated from the stabilizer content through a second outlet;
wherein the stabilization unit includes water, and wherein the bottom temperature of the stabilization unit is less than the boiling point of the water.

The present invention further provides a process for treating a crude and natural gas stream, which at least comprises the steps of:
(a) passing a crude and natural gas stream through an inlet into a stabilization unit having a plurality of trays including a bottom tray to provide a stabilizer content;
(b) passing an overhead gaseous stream separated from the stabilizer content through a first outlet; and
(c) passing a bottom stream comprising crude liquid hydrocarbons separated from the stabilizer content through a second outlet;
wherein the stabilization unit includes free water below the bottom tray.

The present invention also provides a bottom stream at least comprising crude liquid hydrocarbons separated from the stabilizer content of a stabilization unit supplied with a crude and natural gas stream whenever provided by a process as herein defined.

BRIEF DESCRIPTION OF THE DRAWINGS

Embodiments of the present invention will now be described by way of example only, and with reference to the accompanying non-limiting drawings in which.

For the purpose of this description, a single reference number will be assigned to a line as well as stream carried in that line. Same reference numbers refer to similar components.

DETAILED DESCRIPTION OF THE INVENTION

It is an object of the present invention to simplify a stabilization unit and stabilization process.

The present invention provides a process that allows the bottom stream to comprise free water. This can be achieved by allowing free water to exit with the bottom stream. In this way, it is possible to reduce and optionally eliminate processes and equipment conventionally required prior to the stabilization unit to remove water from the crude and natural gas stream. This reduces and optionally eliminates the associated CAPEX and OPEX of the stabilization unit and process.

In the specification and in the claims, the expression "crude and natural gas stream" is used to refer to a stream comprising crude liquid hydrocarbons and natural gas. Crude liquid hydrocarbons include crude oil and crude condensates, including crude naphtha, which are commonly produced or provided together with natural gas from a source such as a well or wellhead. In the specification and in the claims, the expression "treating a crude and natural gas stream" is used to refer to treating the stream to obtain a stabilized crude hydrocarbon stream such as stabilized crude oil, and a gaseous stream that can be passed to a pipeline or sent for further processing such as to a liquefaction plant.

Figure 1:
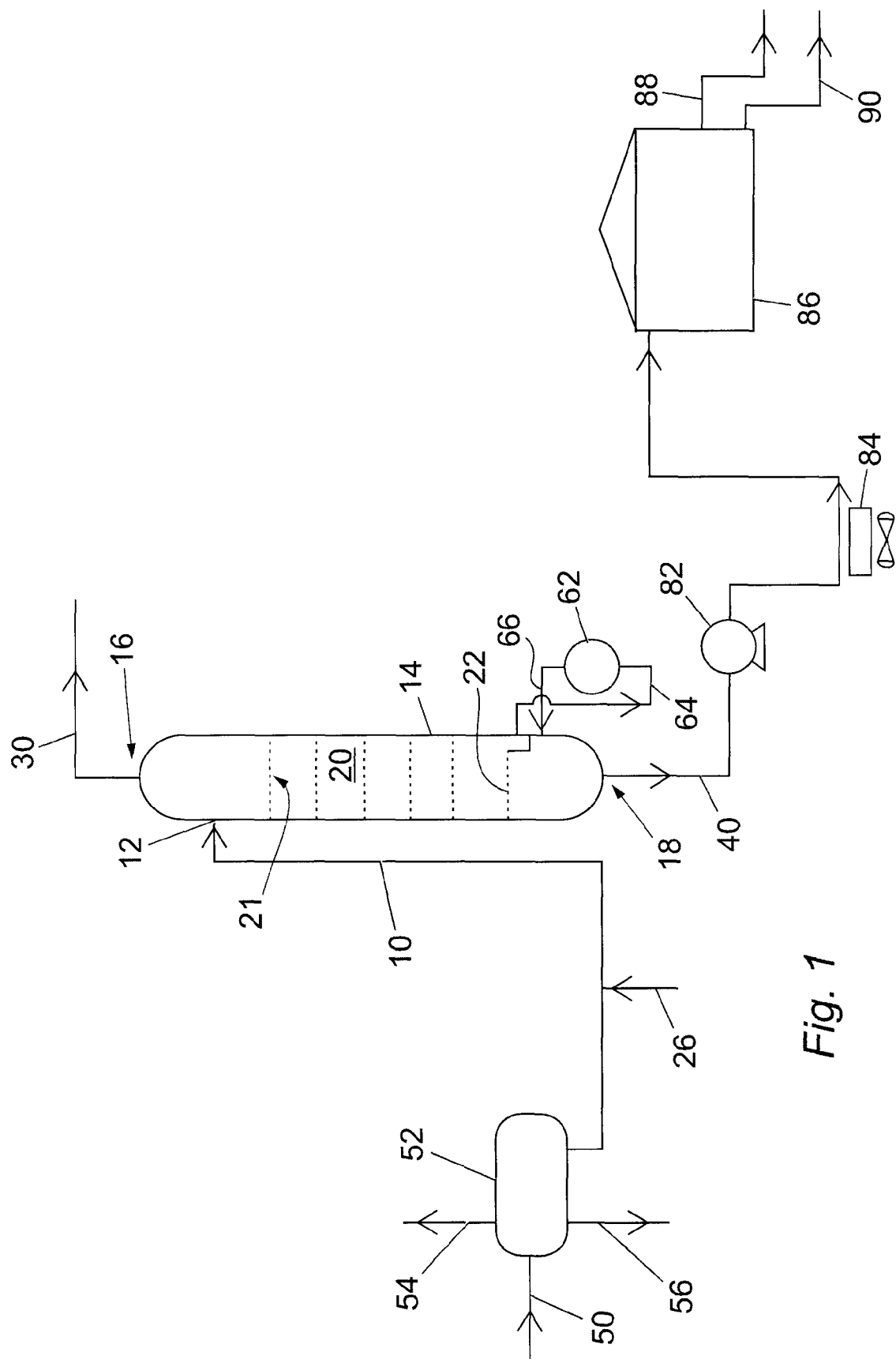
FIG. 1 is first scheme of a process of treating a crude and natural gas stream according to one embodiment of the present invention.

FIG. 1 shows a process for treating a crude and natural gas stream according to one embodiment of the present invention. The process is intended to treat the stream to obtain a stabilised crude liquid hydrocarbons and an overhead gaseous stream. A process for treating a crude and natural gas stream may also include other items or units such as condensers, or have other stream line-ups such as split-streams, such that the present invention in not limited to the particular scheme shown in FIG. 1.

FIG. 1 shows an initial crude and natural gas stream 50, which typically comprises crude liquid hydrocarbons, for example in the form of oil, and gas and water. The general nature and proportions of oil, gas and water in crude oil streams are known in the art, or can be reasonably expected based on knowledge of existing sources of crude oil.

Typically, the initial stream 50 passes through an initial phase separator to provide coarse separation of at least some water and fractions of one or more solids and/or one or more gases from the initial stream 50 in a manner known in the art. For example, the phase separator 52 shown in FIG. 1 allows for the separation of one or more gases such as methane through a gaseous line 54, and water and solids such as sand-entrained solids through a water and solids line 56. From the phase separator 52, there is provided a crude and natural gas stream 10 as a feed stream for the downstream stabilizer process.

Hitherto, it is conventional to pass a feed stream for a stabilization unit through one or more water separators and/or dryers such as a coalescer in order to reduce the water and/or steam content of the feed stream as far as possible prior to entry into a stabilization unit.

Stabilization units are well known in the art. One purpose of a stabilization unit is to remove undesired compounds from the crude and natural gas stream. For example, it is generally desired to remove (such as by a stripping process) hydrogen sulphide and lighter mercaptans from crude oil so as to 'sweeten' the crude oil, and to provide 'sweet crude oil' from 'sour crude oil'. Typically it is intended to reduce the $H_2S$ content of sweet crude oil to less than 100 ppm or lower. The maximum content can vary as some users of sweet crude oil accept or allow different $H_2S$ contents.

Another function of a stabilization unit is to reduce vapour pressure so that the crude liquid hydrocarbons from the stabilization unit meet a desired specification. One component of a desired specification for crude oil can be a specific Reid Vapour Pressure (RVP), which is commonly used to ensure that the crude oil from the stabilization unit is acceptable for storage and/or transportation by a sea-going vessel such as an oil tanker.

Stabilization is a form of distillation, and the general process, typical operating conditions and parameters, and apparatus therefor, are all well known in the art. Generally, compounds such as $H_2S$ and lighter hydrocarbons are stripped from the content of the stabilization unit and passed upwardly therethrough to provide an overhead stream, whilst the heavier and increasingly sweeter crude liquid hydrocarbons pass downwardly towards the bottom of the stabilization unit.

Conventionally, it is desired to minimise the water content of the feed stream for at least two reasons. Firstly, the stabilization process is typically carried out with a temperature at the top of the stabilization unit being less than the boiling point of water, and a temperature at the bottom of the stabilization unit being greater than the boiling point of water.

It is noted that the boiling point of water is known to vary with pressure; increasing the pressure of water increases its boiling point. Thus, references herein to the boiling point of (free) water in the stabilization unit are based on the prevailing pressure in the stabilization unit. Further, references herein to the boiling point of (free) water in the stabilization unit are to the boiling point of water having the composition of the free water in the stabilization unit. It is known that salts dissolved in water have the effect of increasing the boiling point.

According to a preferred embodiment, the bottom temperature of the stabilization unit is less than the boiling point of pure water at the prevailing pressure in the stabilization unit.

It is also noted that gas and oil are able to have water dissolved or otherwise conjugated therewith, and such water is typically defined as "dissolved water" in the art.

Thus, water that is involved or included in or with one or more streams, lines or units in the present invention that is not dissolved water, is herein termed "free water".

The maximum dissolved water content (or "water carrying capacity") of a typical gaseous hydrocarbon stream is 0.2 to 3 vol % for crude oil-based stabilization, depending on the top temperature and pressure. As the top and bottom temperatures of a stabilization unit are conventionally below and above the boiling point of water respectively, any more water in the stabilization unit, brought into the stabilization unit with the feed stream, becomes 'trapped' in the unit, as it is unable to pass out of the top of the stabilization unit as free water with the overhead gaseous stream, and is unable to pass out of the bottom of the stabilization unit as part of the liquid stream. With increasing water content in the stabilization unit, there is increased foaming and flooding in the stabilization unit.

Foaming is caused by the water changing the surface tension of the fluids therein. This leads to loss of separation efficiency and off-specification or non-specification product streams. Flooding is based on the increasing liquid and vapour flow rates in the stabilization unit. With increasing vapour velocity, the liquid is increasingly prevented from flowing down the unit.

A second problem with the increasing water content in the stabilization unit is based on any salt content in the water. Due to the conventional raised temperatures in a stabilization unit, such salts are typically deposited either within the stabilization unit, or on or in any reflux or recycle systems such as a reboiler at or near the bottom of the stabilization unit. With increasing water content, there is increasing salt deposition.

Hence the desire hitherto to minimize as far as possible the water content of a feed stream into a conventional stabilization unit, and the conventional use of one or more dedicated drying steps after the initial coarse phase separator.

Conventionally, there is also usually an additional water separator, such as a draw-off tray, in the stabilization unit, with the particular purpose of providing a stream of water to be drained from the side of the stabilization unit. A draw-off tray is often located at or near a mid-point of the stabilization unit (i.e. between the top of the stabilization unit, being at a condensing temperature for contained water, and the bottom the stabilization unit, being at a vaporisation temperature for the contained water). In this way, any water remaining in the crude liquid hydrocarbons after the water separators and/or dryers is drained from the side of the stabilization unit so as to continue to minimise water content to the stabilization unit, and continue to keep the stabilization process 'dry' or in a dry mode.

The present invention provides a process wherein there is no active water reduction in the crude and natural gas stream 10 prior to the stabilization unit 14, and wherein a bottom stream 40 comprising crude liquid hydrocarbons separated from the stabiliser content 20, and comprising free water, passes through a second outlet 18 from the stabilization unit 14.

The present invention has been achieved by surprisingly recognising that it is still possible to meet a desired specification of a bottom stream of the stabilization unit 14, in particular a desired specification of a sweet crude oil, whilst involving free water.

Thus, in the present invention, the crude and natural gas stream 10 passes directly into a stabilization unit 14 such as a column through an inlet 12 to provide a stabilizer content 20, or is at least one feed for the stabilizer content 20, without further processing, especially without any water removal or reduction, simplifying the overall crude liquid hydrocarbons processing and stabilization process.

In one embodiment of the present invention, the crude and natural gas stream 10 includes free water. The free water in the crude and natural gas stream 10 is preferably ≥0.1 vol % of the crude and natural gas stream 10. The volume % of free water in the crude and natural gas stream 10 may be any higher value or range, such as 0.1-0.5 vol %, 0.2-0.5 vol %, ≥0.2 vol %, ≥0.3 vol %, ≥0.4 vol %, ≥0.5 vol %, 0.1 to 1, 2, 3, 4, 5, 6, 7, 8, 9, 10 vol %, 0.2 to 1, 2, 3, 4, 5, 6, 7, 8, 9, 10 vol %.

In the stabilization unit 14, the stabiliser content 20 comprises a vapour/liquid mixture based on the crude and natural gas stream 10 and any of one or more reflux or recycle streams as hereinafter discussed. As described hereinabove, the action in the stabilization unit 14 is to separate an overhead gaseous stream 30 from the stabiliser content 20, which passes out through a first outlet 16 of the stabilization unit 14. Generally, the overhead gaseous stream 30 comprises at least the majority of the $H_2S$, and lighter hydrocarbons from the crude and natural gas stream 10 such as methane.

In another embodiment of the present invention, the bottom temperature of the stabilization unit 14 is less than the boiling point of free water in the stabilization unit 14. The bottom temperature can be measured at or near the physical bottom of the stabilization unit 14, at or near the second outlet 18, or as the temperature of any reboiler stream 66 (hereinafter discussed). The bottom temperature of a stabilization unit is a term understood in the art. Preferably, the bottom temperature of the stabilization unit is defined as the temperature of any reboiler stream 66.

A function of allowing the bottom temperature of a stabilization unit 14 to be less than the boiling point of free water in the stabilization unit 14 is that a bottom stream 40 provided from the stabilization unit 14 can comprise not only crude liquid hydrocarbons separated from stabiliser content 20, but also free water in the stabilization unit 14, more particularly free water collected at or near the bottom of the stabilization unit 14. Such free water can therefore be part of the bottom stream 40, for example, >0.01 vol % of the bottom stream 40, or >0.5 vol %, or >1 vol % or higher, including >2 vol %. The free water may even be present in an amount of up to 10 vol % or more.

The volume of free water in the bottom stream 40 is usually related to the volume of water in the crude and natural gas stream 10, as further discussed hereinafter in relation to FIG. 4. This may be subject to any water side streams from the stabilization unit 14, as also further discussed hereinafter.

In one embodiment of the present invention, the volume of free water in the bottom stream 40 is based on the volume of water in the crude and natural gas stream 10, less the dissolved water content of the overhead gaseous stream 30.

An advantage of the present invention is recognising that the bottom stream 40 from the stabilization unit 14 may have a higher water content than previously expected, while still being able to achieve a desired specification such as a desired RVP, and more particularly a maximum $H_2S$ content (such as 20 ppm).

A further benefit of the present invention is provided by recognition that free water in the stabilization unit can assist stripping of the stabiliser content 20 to provide the desired overhead gaseous stream 30 and bottom stream 40, in particular to assist stripping of $H_2S$, lighter mercaptans and lighter hydrocarbons from crude oil, and remove them as part of the overhead gaseous stream 30. In particular, the free water generates additional vapour traffic in or up the stabilization unit 14.

By having a bottom temperature of the stabilization unit 14 being less than the boiling point of free water in the stabilization unit 14, this provides control of the movement of free water up and down the stabilization unit 14 to achieve the desired steam stripping action.

Thus, another advantage of the present invention is reducing the temperature at the bottom of the stabilization unit 14 from the conventional above water-boiling-point temperature, thus reducing the heat input and energy usage required for the stabilization unit, such as by a reboiler as discussed hereinafter.

FIG. 1 shows a reboiler 62 known in the art, which receives at least a portion, usually all, of the lower content of the stabilization unit 14 through a recycle line 64 at or near the bottom of the stabilization unit 14, for heating and return as a reboiler stream 66 into the stabilization unit in a manner known in the art. The heated reboiler stream 66 assists in providing a temperature gradient from the bottom to the top of the stabilization unit 14 in a manner known in the art.

The stabilization unit 14 shown in FIG. 1 comprises a plurality of trays 21 having a configuration, layout, arrangement or system in a manner known in the art, including a lowermost or bottom tray 22.

In another embodiment of the present invention, the stabilization unit 14 includes free water below the bottom tray 22.

The stabilization unit 14 may still include a draw-off tray (not shown) (adapted to provide a side stream of water from the stabilization unit 14), to maintain the amount of water in the stabilization unit 14 at a suitable or at the desired level.

The bottom stream 40, comprising crude liquid hydrocarbons separated from the stabilizer content 20 and free water, passes through a pump 82, a cooler 84 and into a storage tank 86, from which a sweet crude liquid hydrocarbons stream 88 can be provided in a manner known in the art. The storage tank 86 also has a water removal line 90 known in the art.

It is also known in the art that a stabilization unit 14 can operate at a range of pressures. The pressure in the stabilization unit 14 is preferably >0.1 MPa, more preferably in the range 0.2-2 MPa, typically in the range 0.6-1.5 MPa.

With changing pressure, the boiling point of water also changes. Thus, the greater the pressure in the stabilization unit 14, the higher the temperatures which may be used at the top and bottom of the stabilization unit. Nevertheless, it is an object of the present invention that the temperature at the bottom of the stabilization unit is below the boiling point of free water, preferably >5° C. below the boiling point of the free water, under the prevailing pressure in the stabilization unit 14. Typically, the temperature at the bottom of the stabilization unit is not more than 30° C. below the boiling point of the free water, under the prevailing pressure in the stabilization unit 14. The skilled person will be able to chose the preferred bottom temperature below the boiling point of water based on the desired RVP of the crude oil in bottom stream (40).

By way of example, a conventional oil stabilization unit to provide stabilized crude oil may use a bottom temperature of 133.4° C. at a pressure of 0.28 MPa in order to provide a 'dry' (i.e. minimal or no free water) stabilizing operation or mode. The present invention allows the bottom temperature to be reduced to, for example, 104.4° C. at the same pressure. Similarly, a bottom temperature of 151.4° C. for a condensate stabilization unit at an operating pressure of 0.7 MPa can be reduced by the present invention to 126.4° C. at the same pressure.

It is another advantage of the present invention that reducing the bottom temperature of the stabilization unit also reduces thermal degradation of the components of the stabilizer content 20, including any contaminants and undesired compounds, thereby reducing problems associated therewith.

In another embodiment, the present invention also or alternatively allows the pressure in the stabilization unit 14 to be increased rather than the bottom temperature to be reduced. By increasing the pressure in the stabilization unit 14, the boiling point of water will increase, such that the bottom temperature can (without itself changing) become lower than the boiling point of the water at the increased stabilizer pressure. Increasing the pressure in the stabilization unit 14 may assist any compression system that is used on the overhead gaseous stream 30 prior to its next use or transfer, such as a pipeline for transportation over a distance.

Free water in the stabilization unit 14 can be achieved by its presence in the crude and natural gas stream 10. Additionally and/or alternatively, free water can be added directly into the stabilization unit 14 (not shown), and/or it can added to the crude and natural gas stream 10 at a suitable point, junction or location. An example of this is through a water supply line 26 shown in FIG. 1.

Figure 2:
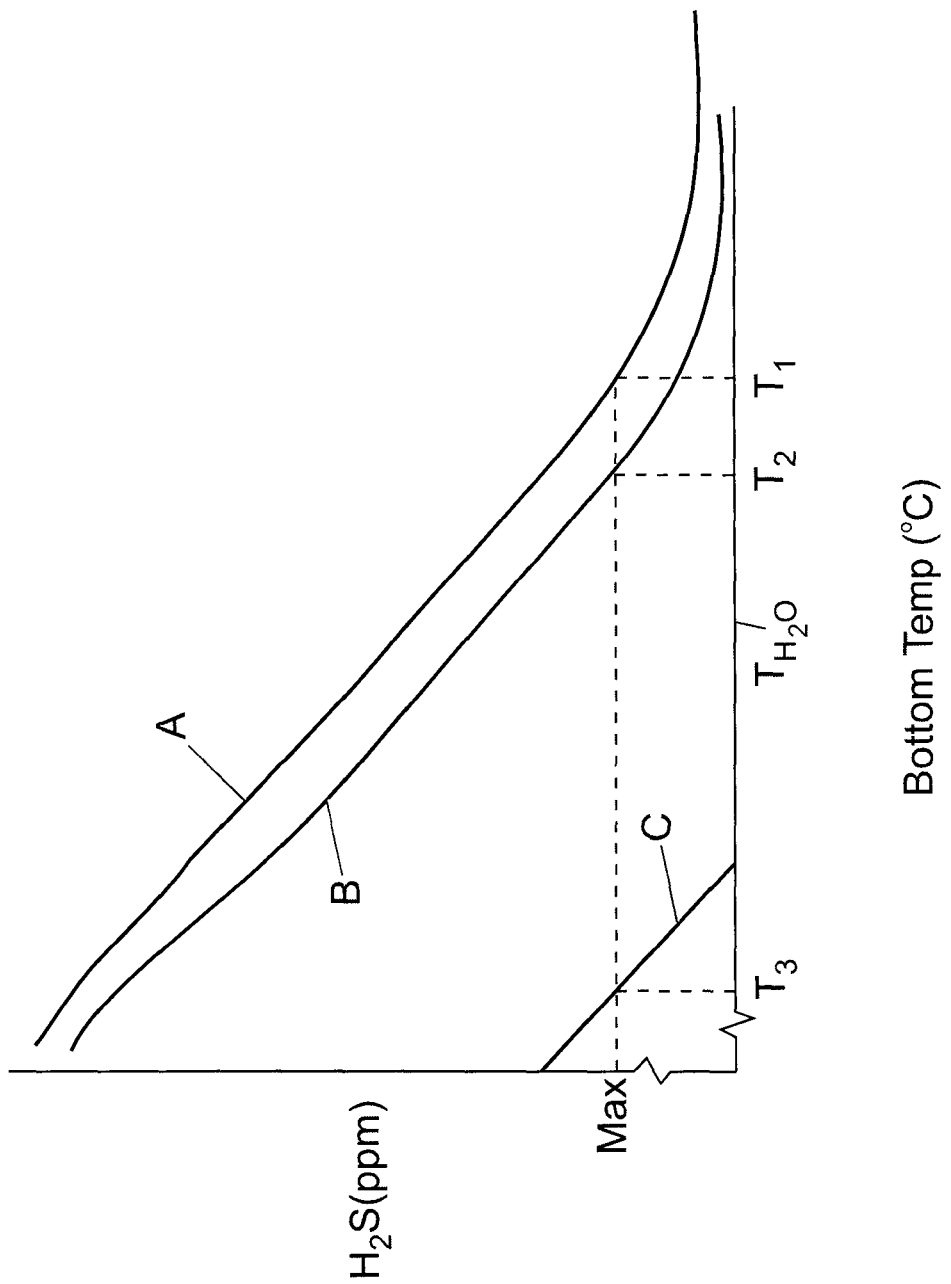
FIG. 2 is a graph of the $H_2S$ content of three bottom streams from a stabilization unit based on different feed stream water content, against the stabilization unit bottom temperature.

FIG. 2 is a graph of the $H_2S$ content of three bottom streams from a stabilization unit based on different water content in their feed streams, against bottom temperature of the stabilization unit.

Line A shows the amount (in ppm) of $H_2S$ in a first bottom stream from a stabilization unit operating at a standard pressure, against an increasing stabilization unit bottom temperature. For Line A, the stabilization is run as a dry process, i.e. there is no free water in the feed stream and in the stabilization unit. Assuming a selected desired maximum level of $H_2S$ in the bottom stream (labelled as "Max"), it can be seen that a bottom temperature of T1 is required before this can be achieved in the dry stabilization process.

Line B shows the same operational parameters of stabilization as used in Line A, but including 0.15 vol % of water in its feed stream, which, as discussed hereinabove, can pass out of the stabilization unit as dissolved water with the overhead gaseous stream. As can be seen, providing some water in the stabilization unit 14 for Line B allows use of a slightly lower bottom temperature, T2, to achieve the same desired maximum level of $H_2S$ compared with Line A, but T2 is still above the boiling point of water ($T_{H2O}$) at the prevailing pressure in the stabilization unit.

Line C shows operation of the same stabilization unit with a free water content of 0.2 vol % in its feed stream. To achieve the same maximum amount of $H_2S$ in the bottom stream, it can be seen that temperature T3 can be used, which is dramatically lower than the $T_{H2O}$ and even further lower than T2 and T1.

FIG. 2 confirms that the wet operation of the stabilization unit according to embodiments of the present invention allows a significantly lower bottom temperature to be used, whilst achieving same $H_2S$ content in the bottom stream.

Figure 3:
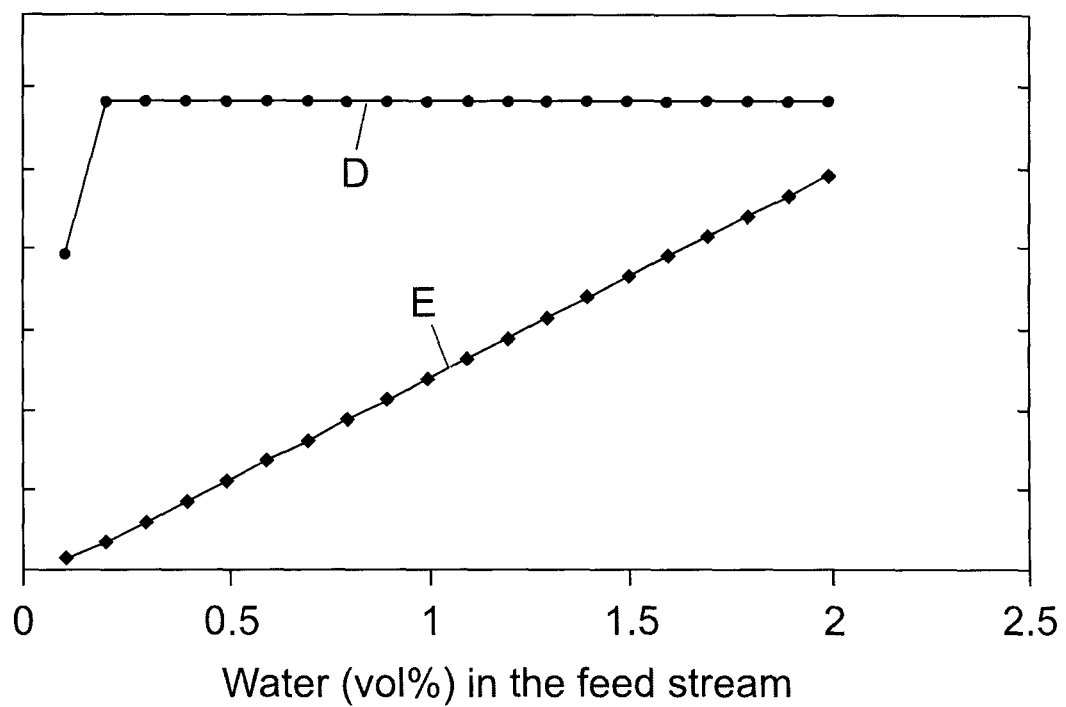
FIG. 3 shows water loadings in a gaseous stream and in a bottom stream from a stabilization unit based on water content of the feed stream, according to the present invention.

FIG. 3 shows water content in a gaseous stream (Line D) and in a bottom stream (Line E) from a stabilization unit, based on increasing water content (in vol %) of the feed stream into the stabilization unit according to an embodiment of the present invention.

Line D shows that once the water content of the feed stream is above about 0.15 vol %, the gaseous stream has reached its maximum carrying capacity (of dissolved water in the gas or gases, as discussed above). Beyond that amount, the gaseous stream cannot carry any more water despite an increasing amount of water in stabilization unit.

Line E shows that based on the present invention, an increasing amount of water in the stabilization unit, based on an increasing water content in the feed stream, can be carried out of the stabilization unit as part of the bottom stream, and in direct correlation thereto. Where there is no other water outlet from the stabilization unit, the water in the bottom stream equates to the amount of water in the feed stream, less the 0.15 vol % of dissolved water in the gaseous stream.

The presence of free water in the stabilization unit 14 can be described as providing a 'wet' mode or operation. This is in contrast to the 'dry' mode or operation as hereinbefore discussed.

Figure 4A:
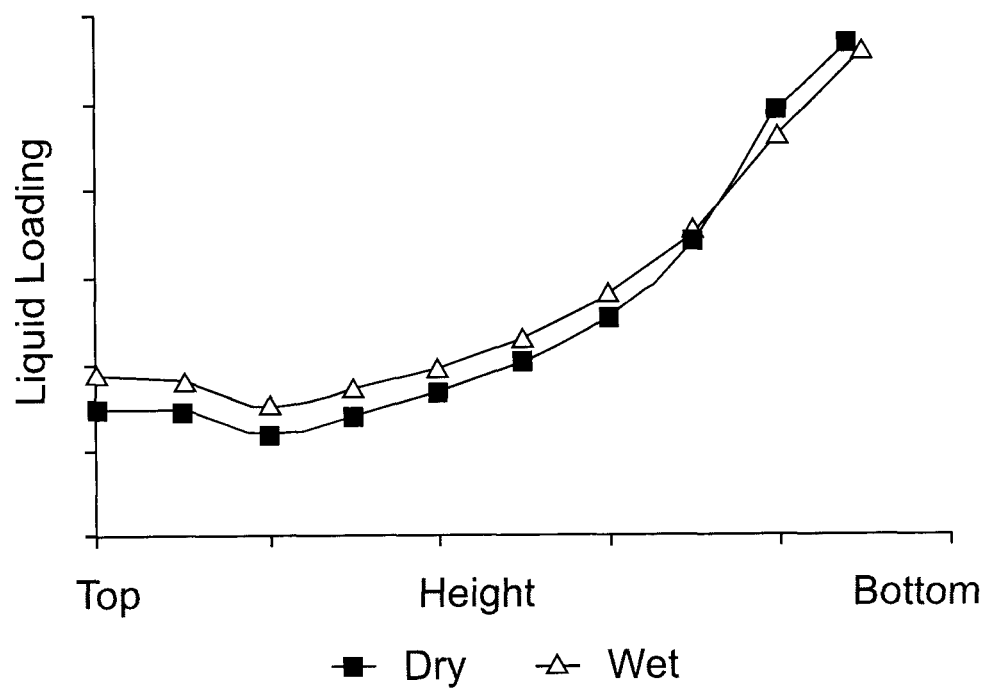
FIGS. 4a and 4b are liquid and vapour comparisons respectively of tray-loading against stabilization unit height, using a conventional dry mode, and using a wet mode according to the present invention, respectively.
Figure 4B:
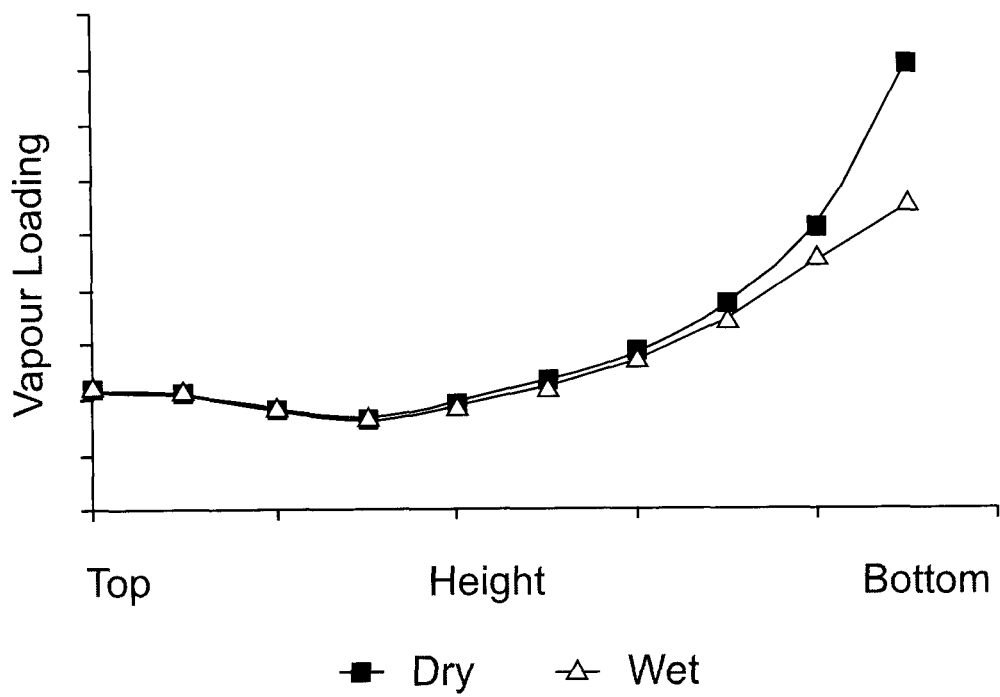

FIGS. 4a and 4b are wet and dry mode comparisons of liquid and vapour loadings respectively against tray height along (down) the length of a stabilization unit. In FIG. 4a, the dry mode illustrates the loading on each tray starting from the top of a stabilization unit to the bottom with no free water in the stabilization unit 14. FIG. 4a also shows comparison with the wet mode based on an embodiment of the present invention FIG. 4a shows a highly statistical correlation of the liquid loadings on the trays in the stabilization unit. The wet and dry mode comparisons are carried out on the same trays in the same stabilization unit under the same processing conditions. For an oil stabilization unit, the dry mode operation requires a reboiler duty of 16.9 MW to achieve a bottom temperature of 133.4° C. at 0.28 MPa pressure. In comparison, in the wet mode operation, the re-boiler duty is 10.7 MW, which is 37% less than 16.9 MW, because the bottom temperature can be reduced to 104.4° C. at the same operating pressure. Thus, there is a significant power saving in the reboiler duty in the wet mode operation based on an embodiment of the present invention.

Using a similar comparison for a condensate stabilization unit, the dry mode operation requires a reboiler duty of 11.9 MW to achieve a bottom temperature of 151.4° C. at 0.7 MPa pressure. In comparison, in the wet mode operation, the re-boiler duty is 9.12 MW, which is 23% less than 11.9 MW, because the bottom temperature can be reduced to 126.4° C. at the same operating pressure. Thus, there is a significant power saving in the reboiler duty in the wet mode operation based on an embodiment of the present invention.

FIG. 4b is similar in showing the vapour loadings on trays along the length of a stabilization unit, starting from the top tray down to the bottom tray. Again, there is a very high correlation between the vapour loadings for the dry mode based on conventional operation of the stabilization unit with minimal or no free water therein, and the wet mode of operation according to one embodiment of the present invention. Thus, again, FIG. 4b confirms that operation of the loadings inside the stabilization unit are virtually the same for the wet mode as the dry mode, whilst the re-boiler duty is significantly reduced as discussed above.

FIGS. 4a and 4b confirm that the present invention can be 'retro-fitted' to an existing stabilization unit, column or separator, without requiring new equipment or processes to effect to the present invention therein.

It is a further advantage of the present invention that one or more salts included in the crude and natural gas stream 10, and any free water with the crude and natural gas stream 10, may also pass out through the second outlet 18 with the bottom stream 40, and in this way reduce or avoid their deposition within the stabilization unit 14 or any re-boiler, recycle etc stream. This is because one or more of any such salts may be part of the free water in the stabilization unit 14, and remain dissolved in such free water, and thus exit with the free water that is comprised in the bottom stream 40. In a conventional dry stabilizing mode or operation, where free water is vaporized at the bottom of the stabilization unit, any such dissolved substances, such as one or more salts in the column or an associated unit or other equipment, which may foul surfaces or form blockages.

It is another advantage of the present invention that any temperature-sensitive items or components in a unit or a stream, such as the stabilizer content 20, may be less degraded by the use of a reduced bottom temperature compared with conventional dry process or operations where the bottom temperature is hotter in a conventional dry operational process, this can lead to loss of valuable components or the formation of undesirable degradation products in the stabilization unit.

The present invention is able to reduce CAPEX and OPEX by avoiding or minimising the use of pre-stabilizing separators, coalescers, etc, conventionally used to reduce water content in the crude and natural gas stream feed stream, whilst also reducing power requirement for providing the temperature gradient through the stabilization unit, usually using a re-boiler to provide a heated re-boiler stream. FIGS. 4a and 4b confirm that the wet operation of a stabilization unit according to embodiments of the present invention provide the same or similar liquid and vapour loadings or trays in a tray-based stabilization unit.

EXAMPLE 1

Based on the process conditions for the dry mode stabilization used in Line A of FIG. 2 and in FIGS. 4a and 4b, the following comparative data is an example of the volume percentages of water in a crude oil and natural gas stream, and in the resultant top and bottom streams provided by an oil stabilization unit having dry mode bottom temperature of 133.3° C., a wet mode bottom temperature of 104.4° C., and having an operating pressure of 0.28 MPa.

Oil Stabilization Unit:

| | Feed stream | Top Stream | Bottom Stream |
|---|---|---|---|
| Dry mode (H$_2$O vol %) | 0.0938 | 1.39 | <0.0000005 |
| Wet mode (H$_2$O vol %) | 0.59 | 1.78 | 0.502 |

It can be seen from the data above that there is an over 500% increase of water content in the feed stream in the wet mode operation of the present invention, and a significant vol % of free water in the bottom stream from the stabilization unit, achieved by the lower bottom temperature.

The dry mode water content of the bottom stream can be regarded as effectively "0.0" vol %

EXAMPLE 2

The following comparative data is an example of the volume percentages of water in a crude condensate and natural gas stream, and in the resultant top and bottom streams provided by a condensate stabilization unit, having a dry mode bottom temperature of 151.4° C., a wet mode bottom temperature of 126.4° C., and having an operating pressure of 0.7 MPa.

Condensate Stabilization Unit:

| | Feed stream | Top Stream | Bottom Stream |
|---|---|---|---|
| Dry mode (H$_2$O vol %) | 0.0985 | 0.0792 | <0.000003 |
| Wet mode (H$_2$O vol %) | 0.513 | 0.366 | 0.543 |

It can be seen from the data above that there is again an over 500% increase of water content in the feed stream in the wet mode operation of the present invention, and a significant vol % of free water in the bottom stream from the condensate stabilization unit, achieved by the lower bottom temperature.

The dry mode water content of the bottom stream can again be regarded as effectively "0.0" vol.

A person skilled in the art will readily understand that the present invention may be modified in many ways without departing from the scope of the appended claims.

What is claimed is:
1. A process for treating a crude and natural gas stream, which at least comprises the steps of:
 (a) passing a crude and natural gas stream through an inlet into a stabilization unit to provide a stabilizer content;
 (b) passing an overhead gaseous stream separated from the stabilizer content through a first outlet of the stabilization unit; and
 (c) passing a bottom stream comprising crude liquid hydrocarbons separated from the stabilizer content through a second outlet of the stabilization unit;
 wherein the stabilization unit includes free water, wherein the free water assists in stripping of H2S from the crude and wherein the bottom temperature of the stabilization unit is less than the boiling point of free water in the stabilization unit;
 wherein the stabilization unit has a plurality of trays including a bottom tray;
 wherein the stabilization unit includes free water below the bottom tray; and
 wherein the bottom stream comprises some of the free water from below the bottom tray.
2. The process as claimed in claim 1 wherein the crude and natural gas stream comprises free water.

3. The process as claimed in claim 1 wherein the bottom temperature of the stabilization unit is more than 5° C. below the boiling point of free water in the stabilization unit.

4. The process as claimed in claim 1, wherein the bottom stream comprises more than 0.01 vol % free water.

5. The process as claimed in claim 1, wherein the crude and natural gas stream comprises at least 0.1 vol % free water.

6. The process as claimed in claim 1, wherein water is added to at least one of the crude and natural gas stream and the stabilization unit, to provide free water.

7. The process as claimed in claim 1 wherein the crude and natural gas stream includes one or more salts, and at least one of the salts passes through the second outlet with the bottom stream.

8. The process as claimed in claim 1 wherein water in the stabilization unit provides a steam stripping process to the stabilizer content.

9. The process as claimed in claim 2 wherein the free water in the crude and natural gas stream is 0.1 to 10 vol % of the crude and natural gas stream.

10. The process as claimed in claim 1 wherein the temperature at the bottom of the stabilization unit is not more than 30° C. below the boiling point of the free water, under the prevailing pressure in the stabilization unit.

11. The process as claimed in claim 1 wherein the pressure in the stabilization unit is higher than 0.1 Mpa.

12. The process as claimed in claim 1 wherein the crude liquid hydrocarbons is crude oil.

13. The process as claimed in claim 1 wherein the overhead gaseous steam comprises at least the majority of the $H_2S$ and lighter hydrocarbons from the crude and natural gas stream.

14. The process as claimed in claim 13 wherein the lighter hydrocarbons comprise methane.

15. The process as claimed in claim 13 wherein the overhead gaseous stream further comprises lighter mercaptans from the crude oil.

* * * * *